Oct. 13, 1931.  C. E. REEVES  1,827,487
STEERING STABILIZER
Filed Aug. 28, 1929  2 Sheets-Sheet 1
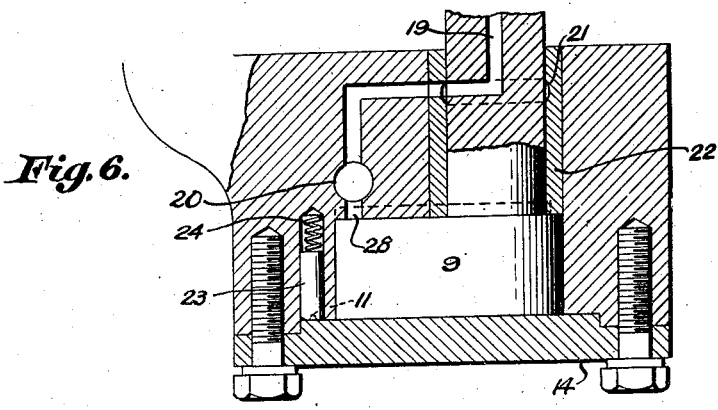
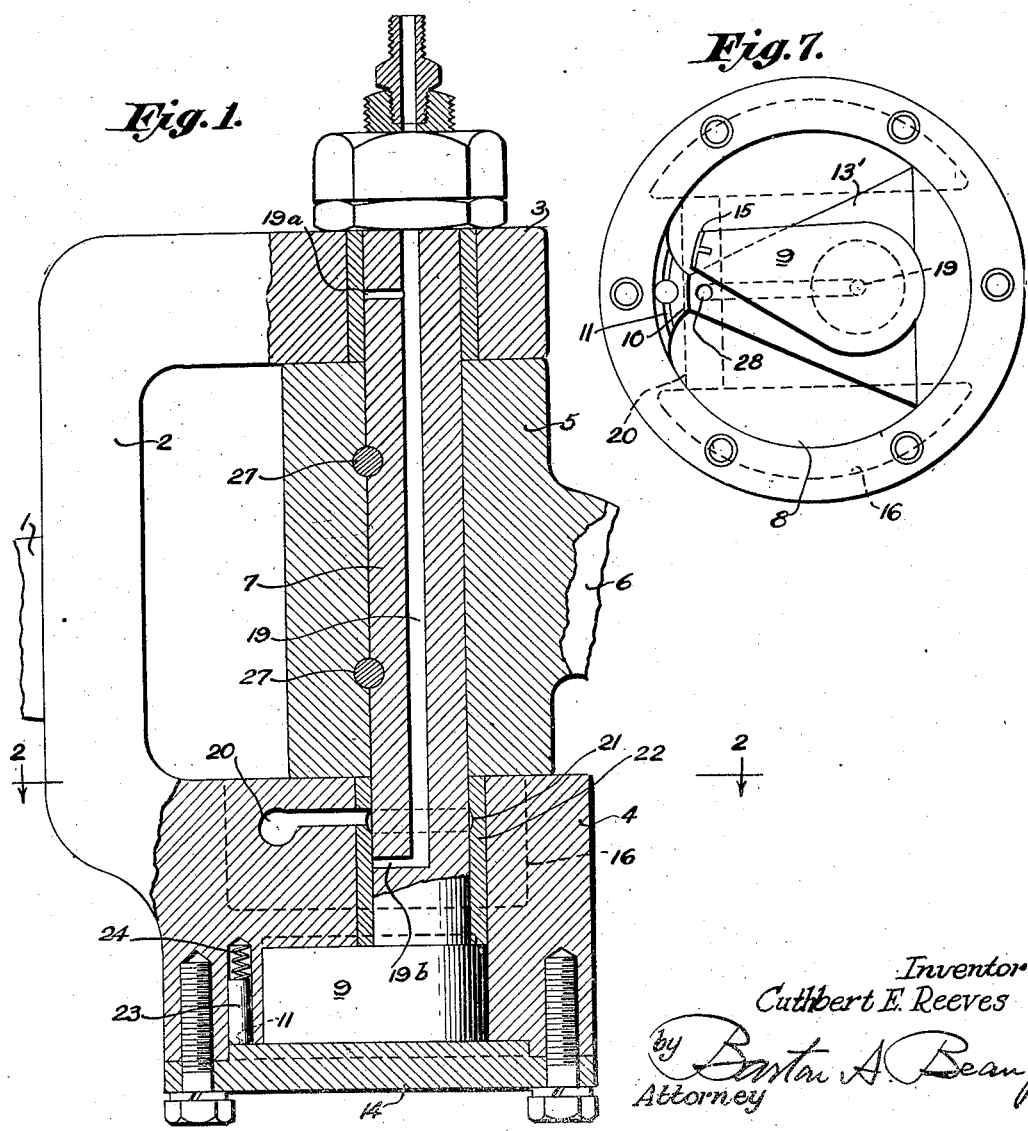
Inventor
Cuthbert E. Reeves
by Barton A. Bean Jr
Attorney Oct. 13, 1931.   C. E. REEVES   1,827,487
STEERING STABILIZER
Filed Aug. 28, 1929   2 Sheets-Sheet 2

Inventor
Cuthbert E. Reeves
by
Attorney

Patented Oct. 13, 1931

1,827,487

UNITED STATES PATENT OFFICE

CUTHBERT E. REEVES, OF BUFFALO, NEW YORK

STEERING STABILIZER

Application filed August 28, 1929. Serial No. 388,971.

This invention relates to a steering stabilizer for motor vehicles and aims primarily to provide an effective and efficient control for the "shimmy" and other objectionable lateral movements to which the front or steering wheels of motor vehicles are subject.

Devices have heretofore been designed to control or check such objectionable lateral wheel movements but the same have proved undesirable or ineffective due to various reasons. Not only have they been unsightly and cumbersome but they have required considerable attention in the way of lubrication and adjustment of the wearing parts and connections thereof, and have been ineffective due, to a large extent, to the lost motion between them and the wheels which they are designed to hold steady. Car manufacturers have been thus far unable to design away the shimmy which occurs in the front wheels when traveling at a high speed regardless of the various attempts to correct this fault.

My invention is designed to check such shimmy or other lateral movement of the running wheel at its inception; to provide an effective control for the wheel shimmy or other sudden jars to the running wheel which will readily permit of the steering of the wheel and which will leave the wheel free for steering beyond certain limits or confines in which the shimmy and sudden jars occur during the normal running of the motor vehicle.

The invention further resides in the embodiment in the wheel mount of a stabilizer or control which will directly receive and accommodate any forces tending to produce the shimmy or lateral movement of the running wheel so as to immediately counteract or resist such forces without the intervention of any lost play or motion due to an intermediate connection; and also in the embodiment of a stabilizer in the steering knuckle assembly which will act to resist any sudden relative movement between the wheel-carrying spindle and front axle of the motor vehicle resulting from any jar or objectionable force applied to the running wheel.

Further, the invention will be found to reside in the salient features of construction and the arrangements and combinations of parts hereinafter described more in detail, reference being had to the accompanying drawings wherein Fig. 1 is a fragmentary showing of the steering knuckle assembly of a motor vehicle in vertical section with portions remaining in elevation, the yoke element of the assembly carrying the wheel spindle.

Fig. 6 is a view similar to Fig. 1 depicting a modified embodiment of the invention.

Fig. 7 is a view similar to Fig. 3 but showing the modified construction of Fig. 6.

Figure 2:
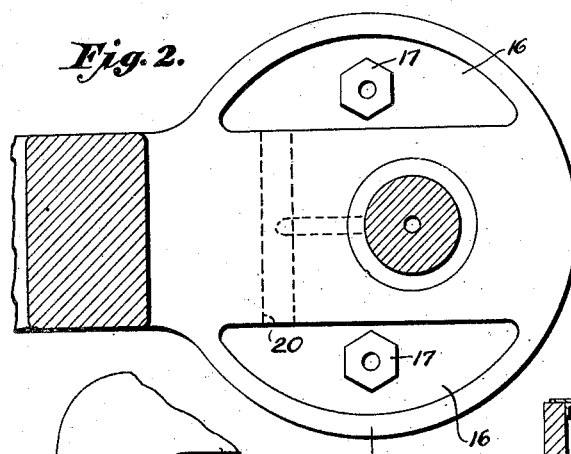
Fig. 2 is a cross sectional view on line 2—2 of Fig. 1 showing the lower knuckle of the yoke in top plan view.
Figure 4:
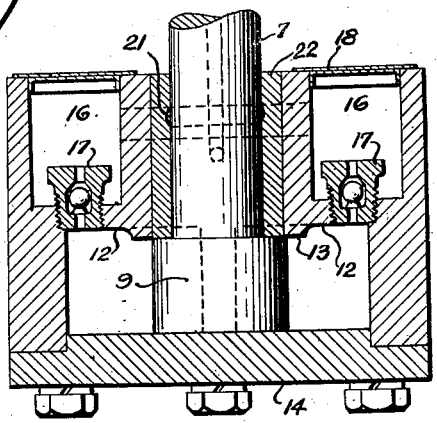
Fig. 4 is a cross sectional view about on line 4—4 of Fig. 2 further disclosing the construction of the stabilizer.

Referring more in detail to the accompanying drawings, in Fig. 1 I have illustrated the yoke element as being carried by the wheel-carrying spindle, such as is frequently used in the modern automobile embodying four wheel brakes. The spindle 1 which carries the running wheel (not shown) is supported by the yoke element 2 comprising an upper knuckle part 3 and a lower part 4 and between which parts is disposed the knuckle part 5 of the front axle 6, the three knuckle parts being provided with openings to receive the steering knuckle pin 7 so that when a steering force is applied to the yoke 2 the latter will pivot about the axis of the knuckle pin 7.

Incorporated in this steering knuckle assembly or unit is a stabilizer which directly receives those forces which would tend to create a shimmy action of the wheel, or which might by reason of their violent character temporarily remove the vehicle from the control of the driver. The stabilizer comprises two relatively movable and cooperating parts one part of which is directly connected to the wheel-carrying spindle and the companion part carried directly by the front axle so that any force tending to create a lateral movement of the running wheel will spend itself in tending to create a relative movement in these parts. This stabilizer embodiment in the steering knuckle assembly is therefore adaptable to either type of assembly whether the yoke be carried by the spindle, as in Fig. 1, or by the front axle, as in Fig. 5, in which latter view the front axle 6' is provided with the yoke 2' comprising the upper knuckle part 3' and the lower knuckle part 4', the steering knuckle pin in this view being indicated at 7'.

The preferred form of stabilizer is of the fluid pressure type and embodies a chamber 8 and a vane piston or wing 9. For convenience and ease of manufacture the vane is carried directly by the knuckle pin 7, (7') while the piston chamber is carried by one of the knuckle parts of the assembly, preferably the lower yoke knuckle part. In its normal position the vane 9 has its free vertical edge in substantial fluid-tight contact with an abutment or boss 10 on the inner wall of the chamber, and together with the boss partitions the chamber 8 into a pair of compartments into which the vane is urged from its normal central position when the wheel is subjected to lateral forces. Such movement of the vane to one side or the other of its normal position will meet with resistance as offered by the compressed fluid in advance thereof. A small transfer orifice or passage 11 is provided to establish restricted communication between the compartments of the chamber 8 at the opposite sides of the vane. Consequently, lateral movement of the vane will be resisted by the fluid trapped in advance thereof, and the vane movement will be retarded, in accordance with the escape of the fluid through the transfer orifice 11 to the rear side of the vane. In the event that a heavy fluid, such as oil, is utilized in the chamber 8 it will be obvious that any sudden jars tending to effect a rapid relative movement between the vane 9 and the boss 10 will be effectively resisted or retarded in accordance with the hydraulic law or principle that the pressure necessary to force fluid through a limited orifice will vary as the square of the velocity of flow, a slow movement of the vane or wing meeting with but little resistance while a quick, sudden movement, such as occasioned by a shimmying action of the running wheel, would encounter a very much greater resistance.

After the vane 9 clears the boss 10 in its sidewise movement, the fluid trapped in advance of the vane will then have a free escape around the nose of the vane regardless of the transfer passage 11. Such position of the vane is illustrated in Fig. 7 where it will be noted that the fluid may readily escape between the vane nose and the boss. To further facilitate the escape of the trapped liquid outside of certain limits of resisted movement of the vane, the ceiling of each compartment of the fluid chamber is recessed, as indicated at 12, thereby providing a central pad 13 with which the vane normally has substantially fluid-tight contact. Thus as the vane moves from the boss 10 it will also have its upper side gradually move off the pad 13 so that the trapped fluid may readily escape not only around the free end of the vane but also over the top thereof. This construction also facilitates the machining operation necessary to provide a substantially fluid-tight contact between the vane 9 and the roof or ceiling of the chamber 8. A closure plate 14 is applied over the open side of the chamber 8 and may have a shouldered fit to give greater seal against leakage. The nose or free end of the vane may be provided with a removable face 15, if desired, to facilitate fitting the same.

Figure 5:
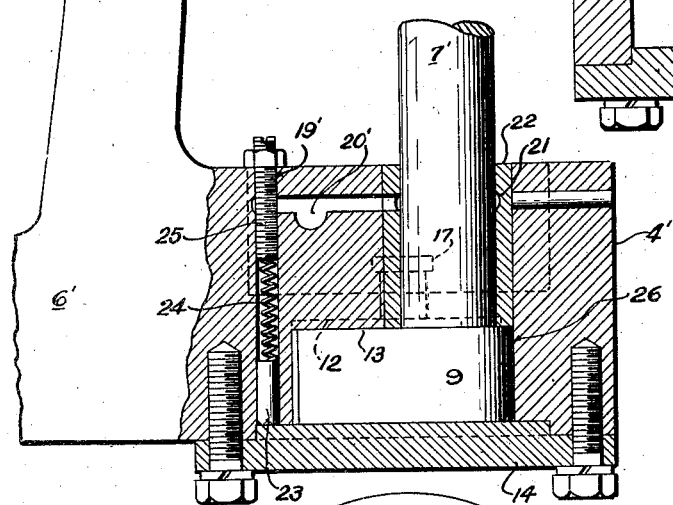
Fig. 5 is a view similar to Fig. 1 but slightly modified and showing the invention applied to a steering knuckle assembly in which the yoke element is carried by the front axle.
Figure 3:
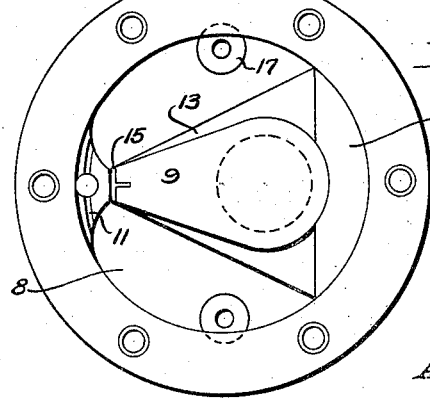
Fig. 3 is a bottom plan view of the same knuckle part of the yoke with the cover plate of the stabilizer chamber removed.

The supply of fluid in the chamber 8 may be replenished as by means of one or more reservoirs. These reservoirs may be conveniently disposed in the upper side of the lower knuckle part 4, as indicated at 16, and communication is established between the reservoir 16 and the chamber 8, such as by means of check valves 17 closing upwardly, as illustrated in Fig. 5. These reservoirs may be closed by covers 18. A filling opening is provided for filling the reservoirs with the fluid or oil. In Fig. 1 the filling opening is provided in the knuckle pin axially thereof, as indicated at 19, a transverse passage 20 connecting the two reservoirs. The filling opening 19, which may have its upper end connectible to a supply, may also serve in the added capacity of a lubricating passage for lubricating the bearing contacts of the pin in the yoke parts 3 and 4, and to this end it has lateral ducts 19a and 19b leading to the bearing surfaces. Any of the fluid which may escape upwardly along the knuckle pin from the chamber 8 is intercepted by an annular groove or bleed passage 21 formed in the adjacent bushing 22, the groove being also connected to the transverse reservoir passage 20 (20'). To insure of thorough lubrication the lateral duct 19b is offset from the groove 21 in Fig. 1, although it may open thereinto, as noted in Fig. 6. In Fig. 5 the filling opening 19' is provided in the wall dividing the two reservoirs, and the transverse passage 20' is likewise formed in this wall.

In order to compensate for the difference in fluid viscosity at extreme temperatures I provide means for varying the size of the transfer passage 11 through the boss 10. This means is illustrated as comprising an impediment in the preferred form of an adjustable metering pin 23, backed by a spring 24 to automatically restrict the size of said orifice or passage. As the fluid congeals or thickens the pin will be elevated by the increased pressure to admit a greater or lesser volume to flow through the transfer passage in order to accommodate the changed conditions. The tension on the metering pin spring may be varied if desired, as by means of a set screw 25 (Fig. 2) which is conveniently threaded in the filling opening 19' to serve also as a closure therefor. The rear or inner end of the vane 9 is rounded off concentrically with the axis of the knuckle pin and may find a fluid-tight bearing in a segmental-shaped wall or barrier 26. This fit may be provided for when boring through the yoke for the bushing 22, the inner end of the vane being curved on an arc having the same radius as that of said bushing. In Figs. 6 and 7 I have illustrated a slightly modified construction in which the check valves 17 are done away with. I accomplish this by having the communicating passage between the reservoir and the chamber 8 opening into the chamber through the pad 13' at a location to be sealed by the vane 9 when in its normal, straight-course position. When in this position communication between the chamber and reservoir will be cut off, and when the vane uncovers the port 28 the fluid will then be free to flow into the chamber 8 behind the vane 9 thereby replenishing the supply of fluid in the event that any has escaped therefrom through leakage or otherwise.

In the operation of the stabilizer, any sudden or violent jarring of the running wheel, or any force tending to set up a shimmy action therein, would be applied directly to the stabilizer and dissipated therein, the same being effectively resisted by the sudden impact of the vane 9 against the head of resisting fluid in advance thereof. The greater this impact is, the greater will be the resistance offered by the fluid, and since there is no play or lost motion between the vane 9 and the running wheel the latter will be held practically free of any lateral vibration or movement which would tend to interfere with the proper control and motion of the vehicle. In this respect it will be noted that the vane is directly carried by the knuckle pin and will move therewith when the wheel-carrying spindle is directly connected thereto to turn with the spindle. Such a construction would be provided for in the embodiment in Fig. 2 wherein the yoke element is carried by the front axle, whereas in Fig. 1, the construction is such that the running wheel is carried by the yoke element and therefore the chamber 8 would be the moving element of the stabilizer while the vane 9 will be held fixed. The knuckle pin 7 is, therefore, secured against rotation, as by means of key pins 27. The knuckle pin is usually formed separately from the intermediate knuckle part, and the yoke element comprises two knuckle parts in the modern make of the motor vehicles.

The improved steering knuckle assembly embodying the stabilizer feature is of simple and durable construction, and may be easily incorporated in the motor vehicle without producing a cumbersome structure. The objectionable forces being applied directly by the wheel to the movable element of the stabilizer are quickly accommodated for and dissipated or materially retarded without the intervention of any lost play or motion. The construction of the stabilizer is such that its presence is not appreciably felt on the steering of the automobile. In fact, the gearing ratio in the steering gear is such that during the initial steering from a truly straight course the stabilizer will offer no appreciable resistance, and after the nose or free outer end of the vane rides off the boss 10, what little resistance may have been offered by the stabilizer during the initial steering movement will be entirely absent from the remaining portion therof.

The yoke bearings are maintained well lubricated since any leakage from the fluid chamber will be along the knuckle pin. Furthermore, the outside source of supply, through the axial passage 19', will also lubricate the bearings as well as replenish the fluid in the reservoirs. Obviously, the fluid flowing along the knuckle pin from the vane chamber will collect in the groove 21 and return to the reservoir. Any air or other gas collecting in the vane chamber, when a liquid is utilized as the checking fluid, will vent itself through the adjacent check valve so as to always maintain a purely liquid head for the vane to act against.

What is claimed is:

1. A steering knuckle assembly for motor vehicles embodying a yoke and a pivotally connected cooperating knuckle, a fluid chamber formed in one of said elements, a vane fixed to the other of said elements and operating in the chamber, a boss within the chamber having normally a substantially fluid-tight contact with the free end of the vane and coacting therewith to divide the chamber into two compartments into which the vane may move upon lateral movement in opposite directions to compress the fluid in the chamber in advance of said vane, a transfer passage establishing restricted communication between the two compartments of the chamber at opposite sides of the vane, and a pressure responsive impediment blocking said passage and movable to an inoperative position to free said passage by actuation of fluid under a predetermined pressure in either of said chamber compartments.

2. A steering knuckle assembly for motor vehicles embodying cooperating knuckle parts, a knuckle pin pivotally connecting the knuckle parts, one of said parts having a fluid chamber, a vane carried by the knuckle pin and operating in the chamber, a boss within the chamber having normally a substantially fluid-tight contact with the free end of the vane, a transfer passage establishing restricted communication between the portions of the chamber at opposite sides of the vane, a reservoir in said chamber-embodying knuckle part, and a valved passage in each portion of the chamber establishing communication between each of said portions and reservoir, said valved passages being individually closable by liquid pressure in the direction of the reservoir upon movement of said vane on said boss.

3. A steering knuckle assembly for motor vehicles embodying cooperating knuckle parts, a knuckle pin pivotally connecting the knuckle parts, one of said parts having a fluid chamber, a vane carried by the knuckle pin and operating in the chamber, a boss within the chamber having normally a substantially fluid-tight contact with the free end of the vane, a transfer passage establishing restricted communication between the portions of the chamber at opposite sides of the vane, a reservoir in said chamber-embodying knuckle part, and a valved passage in each portion of the chamber establishing communication between each of said portions and reservoir, said valved passages being individually closable by liquid pressure in the direction of the reservoir upon movement of said vane on said boss, resilient compression means for retaining said impediment in the passage blocking position, and means for adjusting the compression of said resilient means.

4. In a steering knuckle assembly for motor vehicles embodying a yoke and a cooperating knuckle connected by a knuckle pin secured in said knuckle, the combination of a fluid chamber in the yoke having a central inwardly extending boss, a vane on the knuckle pin mounted for movement in said chamber and having a hub portion in continuous fluid-tight contact with a wall thereof and a tip portion in fluid-tight sliding contact on said boss, said vane tip being movable out of contact with said boss upon relative movement between the yoke and the knuckle, a transfer passage establishing restricted communication between portions of said chamber at opposite sides of said vane, a fluid reservoir, a passage connecting said chamber to said reservoir, and means closing said passage when said vane tip is in engagement with said boss.

5. In a steering knuckle assembly for motor vehicles embodying a yoke and a cooperating knuckle connected by a knuckle pin secured in said knuckle, said yoke having a fluid chamber, a vane on the knuckle pin and operating in the chamber, a restricted passage connecting portions of the chamber on opposite sides of the vane, a movable pin mounted in the yoke and closing said passage, resilient means retaining said pin in blocking position in the passage, said pin being movable by fluid pressure against said passage upon movement of said vane.

CUTHBERT E. REEVES.